(12) United States Patent
Calmettes et al.

(10) Patent No.: US 8,711,033 B2
(45) Date of Patent: Apr. 29, 2014

(54) METHOD AND SYSTEM FOR THE GEOLOCATION OF A RADIO BEACON IN A SEARCH AND RESCUE SYSTEM

(75) Inventors: Thibaud Calmettes, Toulouse (FR); Michel Monnerat, Saint Jean (FR)

(73) Assignee: Thales, Neuilly sur Seine (FR)

( * ) Notice: Subject to any disclaimer, the term of this patent is extended or adjusted under 35 U.S.C. 154(b) by 249 days.

(21) Appl. No.: 13/278,000

(22) Filed: Oct. 20, 2011

(65) Prior Publication Data

US 2012/0098699 A1 Apr. 26, 2012

(30) Foreign Application Priority Data

Oct. 22, 2010 (FR) ...................................... 10 04157

(51) Int. Cl.
*H04B 7/185* (2006.01)

(52) U.S. Cl.
USPC .......................................................... 342/353

(58) Field of Classification Search
USPC .......................................................... 342/353
See application file for complete search history.

(56) References Cited

U.S. PATENT DOCUMENTS

| 6,289,280 | B1 | 9/2001 | Fernandez-Corbaton et al. |
| 6,593,877 | B2 * | 7/2003 | Peeters et al. ............. 342/357.2 |
| 2003/0208317 | A1 | 11/2003 | Chang et al. |
| 2009/0224966 | A1 | 9/2009 | Boling et al. |

FOREIGN PATENT DOCUMENTS

WO 01/04657 A1 1/2001

OTHER PUBLICATIONS

C. Fernandez Prades, et al., "Advanced Signal Processing Techniques in Local User Terminals for Search & Rescue Systems Based on MEO Satellites", ION GNSS 18th International Technical Meeting of the Satellite Division, Sep. 13, 2005, pp. 579-585, XP55004019.

* cited by examiner

*Primary Examiner* — Harry Liu
(74) *Attorney, Agent, or Firm* — Baker Hostetler LLP

(57) ABSTRACT

A method for the geolocation of a device transmitting a signal containing at least one message to a plurality of relay satellites in a medium earth orbit, visible from said device, receiving said message and transmitting it to processing means, comprises at least the following steps: determination of the times of reception of the message by the relay satellites; determination of the pseudo-distances between the device and the relay satellites; searching for and acquiring a minimum number N of satellite radio navigation signals; determination of the time lags between the transmission of the radio navigation signals and their reception by the said device; broadcasting by the device of these time lags in the message; and, determination of the position of the device from at least the pseudo-distances, from the time lags and from the positioning coordinates of the relay satellites and of the radio navigation satellites.

18 Claims, 2 Drawing Sheets

METHOD AND SYSTEM FOR THE GEOLOCATION OF A RADIO BEACON IN A SEARCH AND RESCUE SYSTEM

CROSS-REFERENCE TO RELATED APPLICATION

This application claims priority to foreign French patent application No. FR 1004157, filed on Oct. 22, 2010, the disclosure of which is incorporated by reference in its entirety.

FIELD OF THE INVENTION

The present invention relates to a method and a system for the geolocation of a radio beacon using information transmitted within a search and rescue system associated with that radio beacon.

BACKGROUND

A Search and Rescue system (SAR) is formed of one or more constellations of satellites which receive, on an uplink, an alerting signal coming from a radio beacon. This signal is transmitted on an international distress frequency. The alerting signal is retransmitted to a ground station responsible for extracting from it the distress information which is then sent to a mission control centre.

A known SAR system is the global Cospas-Sarsat system whose main application is the detection of accidents for boats, aircraft or individuals. The Cospas-Sarsat system notably uses a low-orbit constellation of satellites called LEOSAR (Low Earth Orbit Search and Rescue) for receiving alerting messages and transferring them to the ground station.

Another purpose of a SAR system is to locate the radio beacon transmitting the distress signal. For this purpose, the use of low-orbit satellites makes it possible to carry out location by the Doppler-Fizeau effect. A single satellite uses the arrival frequency of the alerting message data at several successive moments time-logged during its movement. As the arrival frequency of the received signal is different each time, it is therefore possible to derive the position of the radio beacon from it.

However, location by the Doppler-Fizeau effect has the major disadvantage of a long location time since a single satellite must carry out several successive measurements during its movement before being able to derive the position of the radio beacon from them. Moreover, the frequency measurements do not have sufficient accuracy for applications requiring very precise positioning. Finally, in order to have a sufficient relative speed, the Doppler-Fizeau measurement is principally usable for low-orbit satellites, which has certain disadvantages: the service life of satellites is shorter and the coverage rate for small sized constellations is also low (typically of the order of 35% for 6 satellites).

A development of the Cospas-Sarsat system consists in using a new constellation of satellites called MEOSAR (Medium Earth Orbit Search and Rescue) having a higher orbit. These satellites are positioned on an orbit principally used by GNSS (Global Navigation Satellite System) satellites such as the satellites of the GPS or GALILEO systems. This orbit is known as the Medium Earth Orbit (MEO) and corresponds to a region of space included between 2000 km and 35000 km. It is thus possible, with the same satellite, to benefit from the SAR alerting and the GNSS geolocation functions. This possibility is foreseen in the first generation of GALILEO satellites and for the third generation of GPS satellites in the years to come.

FIG. 1 is a diagrammatic representation of such a system in the case of application of GALILEO satellites. A radio beacon 101 communicates with a constellation of SAR satellites 102a,102b,102c,102d,102e. At least one of these satellites 102c is also a GNSS satellite. Some of these satellites can also have only the geolocation function. The radio beacon 101 transmits its distress information in an alerting message via an uplink 111,114 to a SAR satellite 102b,102c. The alerting message is then retransmitted to a ground station 104 via a downlink 112,115. The positioning of the radio beacon 101 is carried out principally by the use of a GNSS receiver in the beacon, the position thus calculated being retransmitted via the uplink between the beacon and the satellite. This receiver receives a positioning signal coming from at least four visible GNSS satellites and can derive its position therefrom by known means. The position is then transmitted on the uplink 111,115 with the distress message and arrives at the ground station 104 which can then communicate the position of the beacon to a control centre. An advantage of using medium-orbit satellites is that there is always at least one of these satellites visible from the ground, which makes it possible to ensure provision of an acknowledgement of reception of the alerting message by the ground station.

However, the use of a positioning receiver installed in the radio beacon has disadvantages related to the complexity of the processings to be carried out for the location and to the consumption of the beacon. In particular, in order to locate itself, the GNSS receiver must firstly carry out a search for at least four visible geolocation satellites. By way of example, the decoding of a GPS signal can take between 30 seconds and one minute for the calculation of a first point. The autonomy of the beacon is directly affected by this non-negligible processing time.

The present invention notably has an objective of reducing the complexity and the consumption of a radio beacon by using the functions of the alerting system for determining the positioning directly without using a GNSS receiver or by limiting its use. One of the objectives of the invention is also to reduce the lock-on time prior to determining the positioning. The joint use of the SAR system and the GNSS system is envisaged in order to exploit all of the available resources in an optimum manner.

SUMMARY OF THE INVENTION

The invention relates to a method for the geolocation of a device transmitting a signal containing at least one message to a plurality of relay satellites in a medium earth orbit, visible from the said device, receiving the said message and transmitting it to processing means, characterized in that it comprises at least the following steps:

determination of the times of reception $T_{Ri}$ of the said message by the said relay satellites, determination of the pseudo-distances $D_i$ between the said device and the said relay satellites by solving the system of equations $$T_{Ri} = D_i/c + T_e,$$

where c is the speed of propagation of the transmitted signal, $T_e$ is the time of transmission of the message by the device and i varying from 1 to the number $N_{vis}$ of visible satellites, determination of the position of the said device from at least the said pseudo-distances $D_i$, and from the positioning coordinates of the said relay satellites.

In a variant embodiment of the invention, the relay satellites are part of the constellation of an SAR alerting and rescue system.

In a variant embodiment of the invention, the said signal is a distress signal containing an alerting message.

In a variant embodiment of the invention, the method furthermore comprises:

- a step of searching for and acquiring, by reception means contained in the said device, a number N of satellite radio navigation signals, N being at least equal to $2+m-N_{vis}$ where m is the number of space coordinates of the said device and $N_{vis}$ is the number of relay satellites visible from the device,
- determination of the time lags between the transmission of the radio navigation signals and their reception by the said device,
- broadcasting by the said device of these time lags in the said message,
- determination of the position of the said device by the additional solving of the following equations:

$$T_{Rj}(GNSS)=D_j(GNSS)/c+T_{ej}(GNSS),$$

where $T_{Rj}$ (GNSS) is the time of reception, by the beacon, of the radio navigation signal transmitted by the GNSS satellite j, $T_{ej}$ (GNSS) is its time of transmission and $D_j$(GNSS) is the pseudo-distance between the beacon and the GNSS satellite j.

In a variant embodiment of the invention, the step of searching for and acquiring satellite radio navigation signals is initiated when the number $N_{vis}$ of visible relay satellites is strictly less than 1+m.

In a variant embodiment of the invention, the time of transmission $T_e$ of the said message is measured by the said device and transmitted in the message to the said relay satellites which in their turn transmit it to the said processing means, the minimum number N of searched radio navigation signals then being reduced by one when the number $N_{vis}$ of relay satellites visible from the said device is strictly less than 1+m.

In a variant embodiment of the invention, the method furthermore comprises measurements of the reception frequency of the said signal transmitted by the said device to the said relay satellites, determination of the position of the said device furthermore being carried out from these measurements and from the transmission frequency of the said signal.

In a variant embodiment of the invention, the position of the device information is transmitted with the message to the relay satellites and then to the said processing means.

In a variant embodiment of the invention, the positioning coordinates of the relay satellites and/or of the radio navigation satellites are determined from the ephemeredes of these satellites.

The invention also relates to a system for the geolocation of a device characterized in that it comprises a device able to transmit a message, a plurality of relay satellites in a medium earth orbit able to receive the said message and to broadcast it and processing means able to determine the position of the said device, the said system being adapted to implement the method according to the invention.

In a variant embodiment of the invention, the relay satellites are part of the constellation of an SAR alerting and rescue system.

In a variant embodiment of the invention, the said processing means are located remotely from the said relay satellites or are installed in the said relay satellites.

In a variant embodiment of the invention, the said relay satellites furthermore comprise means of transmission of a radio navigation signal.

In a variant embodiment of the invention, the said device is a radio beacon and the said signal is a distress signal containing an alerting message, the said processing means transmitting the said alerting message to a control centre.

BRIEF DESCRIPTION OF THE DRAWINGS

Other features and advantages of the invention will become apparent with the help of the following description given with reference to the appended drawings in which.

DETAILED DESCRIPTION

Figure 1:
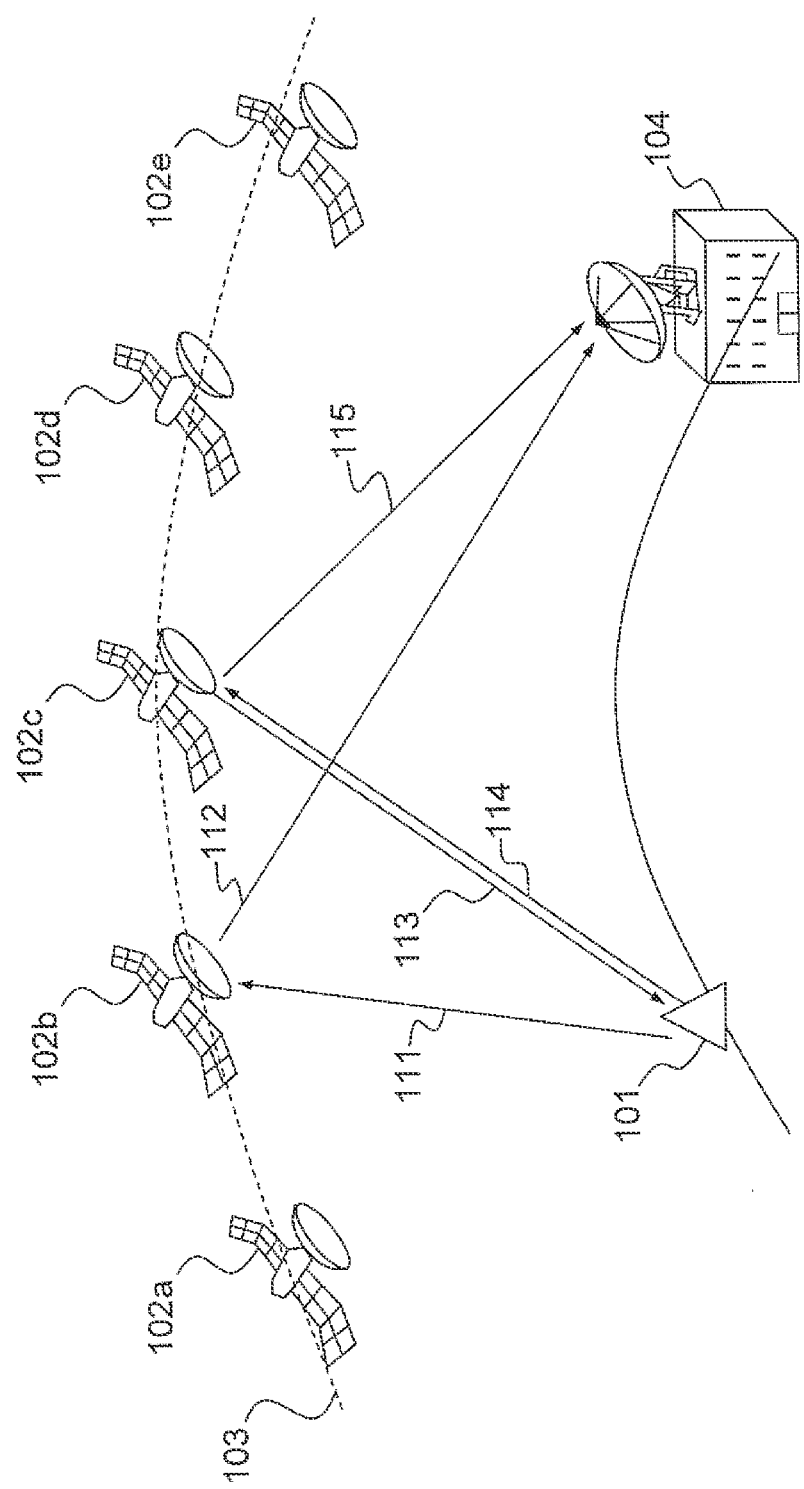
FIG. 1 is a diagram of an alerting system with a constellation of satellites in an MEO orbit.
Figure 2:
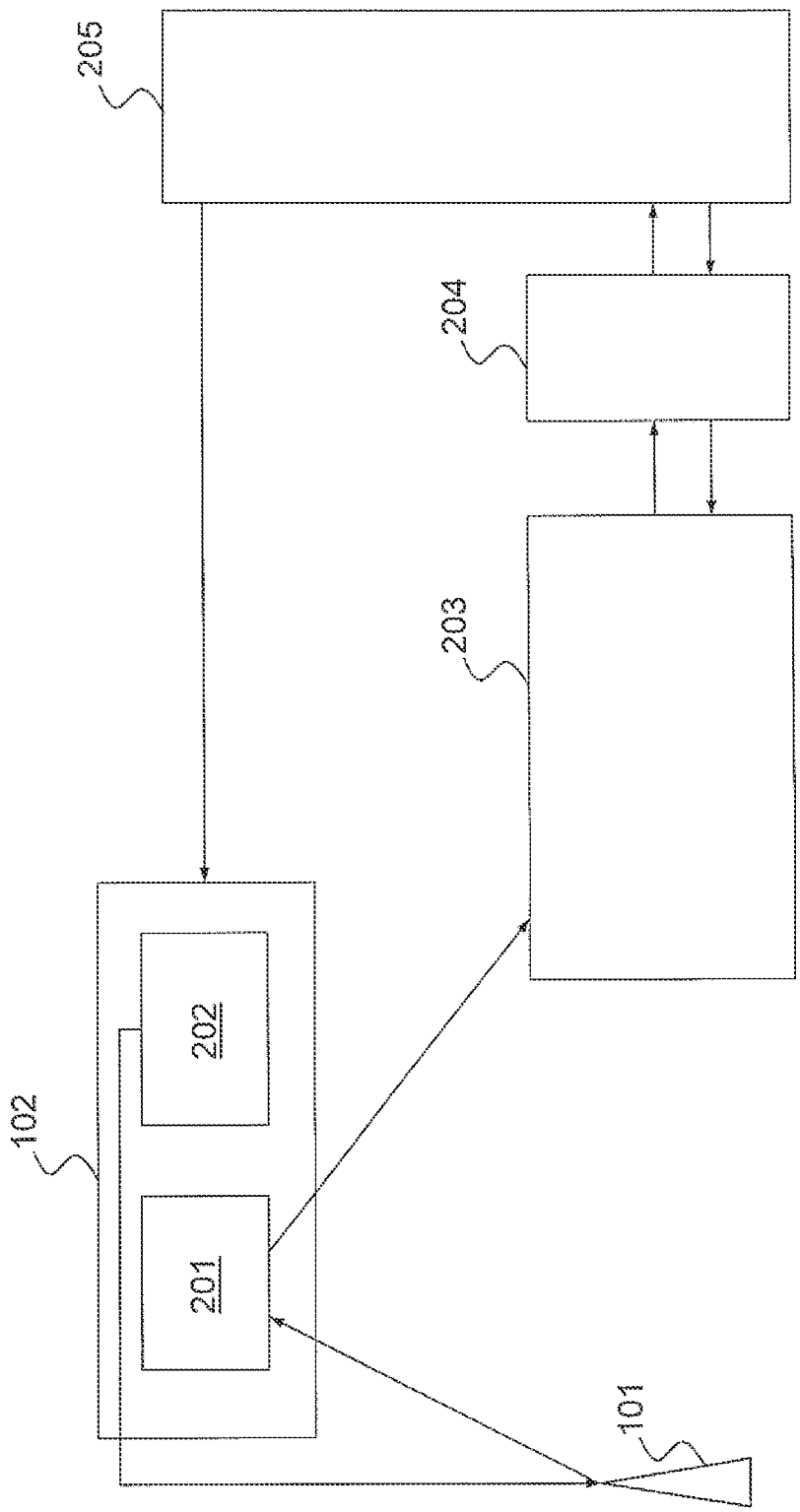
FIG. 2 is a block diagram of a geolocation system according to the invention.

FIG. 2 is a block diagram of the geolocation system of a radio beacon according to the invention. A beacon 101 comprises means of creation and transmission of an alerting signal containing distress information. It furthermore comprises means of receiving a radio navigation signal, for example a signal transmitted by a GNSS satellite. The radio beacon 101 communicates with at least one relay satellite 102 which comprises first means 201 of reception of the alerting signal and of transmission of the said signal to a ground station 203. The relay satellite 102 furthermore comprises second means 202 of radio navigation making it possible to transmit a GNSS signal to the beacon 101 on the ground. The receiving 201 and radio navigation 202 means can be located in two different satellites. A ground station 203 receives the messages contained in the alerting signal and transmits them to a control centre which is not shown. A programming device 204 makes it possible to generate an acknowledgement to the beacon 101. A remote control 205 is responsible for controlling the satellites.

In the continuation of the description, a relay satellite will refer to a satellite comprising means 201 of receiving an alerting signal, for example a satellite compatible with the SAR system.

One of the advantages of using satellites in a MEO orbit is that at any time several satellites are likely to be visible simultaneously from a point on the ground. On the contrary, for an alerting system using a constellation in a close orbit (LEO), most often a single satellite is visible, which leads to the use of a geolocation method based solely on the Doppler information due to the movement of this single satellite.

As mentioned above, when an accident occurs, the radio beacon 101 transmits an alerting signal on a distress frequency to all of the visible satellites which comprise means 201 of receiving such a signal. The alerting signal is broadcast, that is to say it is transmitted to all satellites listening on the distress frequency. An advantage of broadcasting is that it does not require a preliminary search procedure in order to determine which satellites are visible from the beacon. When the alerting message is received by a satellite i, the latter has the ability to time-log it with a time of reception $T_{Ri}$ according to its internal clock. On the basis of this information, it is possible to determine an expression relating the time $T_e$ of transmission of the alerting message by the radio beacon to the time of reception $T_{Ri}$ of the message by the satellite and to the distance $D_i$ between the beacon and the satellite:

$$T_{Ri}=D_i/c+T_e \qquad (1)$$

with c being the speed of propagation of the transmitted signal and i varying from 1 to the number of visible satellites. As the times $T_{Ri}$ and $T_e$ are not measured with the same clock and as asynchronisms can exist between the clock of the radio beacon and that of the satellites, the term "pseudo-distance $D_i$" is used rather than "real distance", which is obtained after estimation of the time shift between the two clocks.

The position of the satellite is known by itself or by the ground station 203. The expression (1) comprises four unknowns, the three coordinates in space of the beacon 101 and the transmission time $T_e$ of the alerting message. Thus, if at least four satellites are visible from the beacon, it is possible to solve the system of equations obtained in order to derive therefrom the exact positioning of the beacon.

In the case where a positioning of the beacon solely in two dimensions is sought, then the expression (1) comprises only three unknowns and only three visible satellites are necessary. In general, the number of satellites necessary is equal to the number of unknowns contained in the expression (1). If m is the number of coordinates of the radio beacon, the number of visible satellites necessary for deriving the positioning of the radio beacon will be equal to 1+m.

In a variant embodiment of the invention, the radio beacon can also include the transmission time $T_e$ in the transmitted alerting message. In this case, the fourth unknown to be removed corresponds to the temporal uncertainty between $T_e$ and the reception time $T_{Ri}$ due to the asynchronisms between the clocks of the satellites and the clock of the beacon.

Thus, by applying the invention with four visible satellites only comprising means of receiving an alerting message, it is possible to totally dispense with the use of a GNSS receiver in the radio beacon which results in an obvious advantage with regard to complexity, autonomy and processing time.

The reception time measurements are carried out on board the satellites and are retransmitted, with the alerting messages and possibly the positions of the satellites to the ground station which is responsible for executing the necessary processings for solving the system of equations with four unknowns making it possible to obtain the positioning of the beacon 101. For this purpose, the ground station 203 comprises means of processing the received information. Alternatively, the solving of the system can also be carried out by the payload on board the satellite which then directly retransmits the positioning information of the beacon to the ground station.

In a variant embodiment of the invention, the reception time measurements can wholly or partly be replaced by Doppler frequency measurements. As the speed of movement of a satellite in an MEO orbit is lower than that of a satellite in a low LEO orbit, the precision associated with these Doppler measurements however is lower.

In practice, particularly in an urban environment where the obstacles are numerous, the number of visible satellites can be less than four. In the case where at most three relay satellites are visible, the present invention makes it possible to complete the measurements necessary for the geolocation of the beacon by complementary measurements carried out on the radio navigation signal received by the beacon.

It is known that a radio navigation signal receiver uses the measurements carried out on the signals coming from at least four satellites in order to determine the information relation to its positioning. For each satellite, the time of reception of the signal by the beacon is related to the time of transmission of the signal by the satellite and to the distance between the satellite and the receiver. The space coordinates of the satellite are transmitted in the signal which must therefore be demodulated entirely by the receiver.

In the case of the invention, the positions of the satellites are known by the ground station 203, either by direct transmission of this information with the alerting message for the satellites carrying out this function, or by the intermediary of ephemeredes. The radio navigation signal received by the beacon does not therefore require a complete demodulation but only an estimation of the difference between the time of transmission by the satellite and the time of reception by the beacon. This estimation is calculated from the detection and the time-logging of a correlation spike in the received signal. By way of example, in a GALILEO signal, this correlation spike, also called a "pilot tone", appears every 4 ms. The time-logging of the correlation spike makes it possible to obtain an item of information on the time lag between the time of transmission by the GNSS satellite and the time of reception by the beacon. A temporal ambiguity remains because the clocks of the satellites and of the beacon are not synchronous. It is not necessary to remove this ambiguity since the unknown $T_e$ is then directly determined in the time reference of the satellite's clock. This information is then transmitted with the alerting message to the relay satellite 102 and then to the ground station 203 and makes it possible, in combination with the measurements on the time of reception of the alerting message by the satellite, to determine the positioning of the beacon.

The system of equations (1) is then completed with the following equations:

$$T_{Rj}(GNSS)=D_j(GNSS)/c+T_{ej}(GNSS) \qquad (2)$$

where $T_{Rj}$ (GNSS) is the time of reception, by the beacon, of the radio navigation signal transmitted by the GNSS satellite of index j, $T_{ej}$ (GNSS) is its transmission time and $D_j$ (GNSS) is the pseudo-distance between the beacon and the GNSS satellite j.

In a variant embodiment of the invention, a complete section of radio navigation signal of sufficient duration to measure a correlation spike can be transmitted by the radio beacon on the uplink with its final destination being the ground station which will be responsible for carrying out the measurements. This variant constitutes a solution which is much simpler for the beacon to implement but is however much more costly in volume of data retransmitted on the uplink, which can be restricting from the point of view of the available bandwidth on the uplink.

In practice, the system comprises five unknowns which are the three coordinates in space of the beacon, the transmission time of the alerting message and the temporal ambiguity in the time-logging of the correlation spike of the radio navigation signal. In this case, the invention can be implemented in the following configurations: three relay satellites and two radio navigation satellites or two relay satellites and three radio navigation satellites. If only one relay satellite is visible, then the radio beacon will have to carry out a search for four radio navigation satellites, as in a conventional GNSS system, but there will be no need to fully demodulate the signals in order to obtain the exact positions of the satellites as mentioned above.

In a variant embodiment of the invention, the transmission time of the alerting message can be transmitted by the beacon, jointly with the said message, in the unit corresponding to its internal clock. The system then comprises only four unknowns. The invention can then be implemented in the following configurations: three relay satellites and one radio navigation satellite or two relay satellites and two radio navigation satellites or else one relay satellite and three radio navigation satellites.

More generally, if N is the number of relay satellites visible from the radio beacon, the latter must carry out a minimum number of 5−N searches for radio navigation signals in the case where the time of transmission of the alerting message is not transmitted and a number of 4−N searches in the opposite case.

The embodiment of the invention described above is based on the example of a SAR system. Without departing from the scope of the invention, the latter also applies to any system for collecting data by satellite in which the data are broadcast from a radio beacon to reception means on board a satellite and retransmitted to a ground station. Moreover, the invention applies in an identical manner to any device equivalent to a radio beacon, which comprises, on the one hand, means of generation, time-logging and transmission of a message to a satellite and, on the other hand, means of receiving and processing a radio navigation signal coming from a satellite.

In brief, the method and the system according to the invention have the advantage of reducing the complexity of the processing operations carried out by the radio beacon for the purpose of its positioning and also of reducing the processing time necessary before the determination of a first measuring point.

The invention uses the joint properties of an alerting system and of a radio navigation system, the satellites of the two systems being located on the same medium earth orbit which allows visibility of a sufficient number of satellites from a point on the ground for determining an item of positioning information by calculation of pseudo-distances.

The invention claimed is:

1. A method of geolocation of a device transmitting a signal containing at least one message to a plurality of $N_{vis}$ relay satellites visible from said device, the method comprising:
   determining times of reception $T_{Ri}$ of said message by the $N_{vis}$ relay satellites,
   determining, from said times of reception $T_{Ri}$ and with respect to a time $T_e$ of transmission of the message by the device, the pseudo-distances $D_i$ between said device and each of said relay satellites $N_{vis}$
   searching for and acquiring a number N of satellite radio navigation signals, N being at least equal to $2+m-N_{vis}$ where m is a number of space coordinates of the device and $N_{vis}$ is the number of relay satellites visible from the device,
   determining an information on a time lag between the time of transmission of each radio navigation signal j and the time of reception of each radio navigation signal j $T_{Ri}$ by the device,
   determining, from said information, the pseudo-distances $D_j(GNSS)$ between the device and each of the N radio navigation satellites, and
   determining the position of the device from the pseudo-distances $D_j$ between the device and each of the $N_{vis}$ relay satellites and from the pseudo-distances $D_j(GNSS)$ between the device and each of the N radio navigation satellites.

2. The geolocation method according to claim 1, wherein the relay satellites are part of a constellation of a search and rescue system.

3. The geolocation method according to claim 1, wherein said signal is a distress signal containing an alerting message.

4. The geolocation method according to claim 1,
   wherein said pseudo-distances $D_j(GNSS)$ between the device and each of the N radio navigation satellites are determined by the additional solving of the equation $$T_{Rj}(GNSS)=D_j(GNSS)/c+T_{ej}(GNSS),$$

where $T_{Rj}$ (GNSS) is the time of reception, by the device, of the radio navigation signal transmitted by the radio navigation satellite j, $T_{ej}$ (GNSS) is the time of transmission by the radio navigation satellite of the radio navigation signal and $D_j$(GNSS) is the pseudo-distance between the device and the radio navigation satellite.

5. The geolocation method according to claim 1, wherein the time of transmission $T_e$ of said message is measured by said device and transmitted in the message to said relay satellites, the minimum number N of searched radio navigation signals then being reduced by one when the number $N_{vis}$ of relay satellites visible from said device is strictly less than 1+m.

6. The geolocation method according to claim 1, further comprising:
   measurements of the reception frequency of said signal transmitted by the said device to said relay satellites,
   determination of the position of said device being carried out from the measurements and from the transmission frequency of said signal.

7. The geolocation method according to claim 1, wherein the positioning coordinates of the relay satellites and/or of the radio navigation satellites are determined from the ephemeredes of the satellites.

8. The geolocation method according to claim 1 further comprising transmitting said information with said message.

9. The geolocation method according to claim 1, wherein said pseudo-distances Di between the device and each of the $N_{vis}$ relay satellites are determined by solving the system of equations $$T_{Ri}=D_i/c+T_e,$$

where c is the speed of propagation of the transmitted signal, $T_e$ is the time of transmission of the message by the device and i varying from 1 to the number $N_{vis}$ of visible satellites.

10. The geolocation method according to claim 1, wherein said pseudo-distances $D_j$(GNSS) between the device and each of the N radio navigation satellites are determined by solving the following equations:

$$T_{Rj}(GNSS)=D_j(GNSS)/c+T_{ej}(GNSS),$$

where $T_{Rj}$ (GNSS) is the time of reception, by the device, of the radio navigation signal transmitted by the radio navigation satellite j, $T_{ej}$ (GNSS) is the time of transmission by the radio navigation satellite of the radio navigation signal and $D_j$(GNSS) is the pseudo-distance between the device and the radio navigation satellite j.

11. The geolocation method according to claim 1, wherein the relay satellites are in a medium earth orbit (MEO).

12. A system for the geolocation of a device able to transmit a message to a plurality of relay satellites, said system comprising:
   a first module for determining the times of reception $T_{Ri}$ of the message by each of a number $N_{vis}$ of relay satellites,
   a second module for determining, from said times of reception $T_{Ri}$ and with resect of a time $T_e$ of transmission of the message by the device, the pseudo-distances $D_j$ between the device and each of the $N_{vis}$ relay satellites,
   a third module for searching for and acquiring a number N of satellite radio navigation signals, N being at least equal to $2+m-N_{vis}$ where m is a number of space coordinates of the device and $N_{vis}$ is the number of relay satellites visible from the device,
   a fourth module for determining an information on the time lag between the time of transmission of each radio navigation signal j and the time of reception $T_{Ri}$, by the device, of each radio navigation signal j, and transmitting said information to a fifth module for determining, from said information, the pseudo-distances $D_j(GNSS)$ between the device and each of the N radio navigation satellites, a sixth module for determining the position of the device from the pseudo-distances $D_i$ between the device and each of the $N_{vis}$ relay satellites and from the pseudo-distances $D_j(GNSS)$ between the device and each of the N radio navigation satellites.

13. The system according to claim 12, wherein the relay satellites are part of a constellation of an SAR alerting and rescue system.

14. The system according to claim 12, wherein said first module, said second module, said third module, said fourth module, said fifth module, and said sixth module are located in a ground station.

15. The system according to claim 12, wherein said relay satellites comprise means of transmission of a radio navigation signal.

16. The system according to claim 12, wherein said device is a radio beacon and said signal is a distress signal containing an alerting message.

17. The system according to claim 12, wherein the first module is located on each relay satellite, the second module is located in a ground station, the third and fourth module are located in the device, the fifth and sixth modules are located in said ground station.

18. The system according to claim 12, wherein the first module is further configured to transmit the times of reception $T_{Ri}$ of the message by each of a number $N_{vis}$ of relay satellites to a ground station, the first and the second module are located in a ground station, the third and fourth module are located in the device, the fifth and sixth modules are located in said ground station.

* * * * *